United States Patent

Mann et al.

[11] 4,291,779
[45] Sep. 29, 1981

[54] WHEEL-MOUNTED HYDRAULIC DRIVE SYSTEM

[75] Inventors: Egon Mann; Helmut Eymüller, both of Friedrichshafen, Fed. Rep. of Germany

[73] Assignee: Zahnradfabrik Friedrichshafen, Aktiengesellschaft, Friedrichshafen, Fed. Rep. of Germany

[21] Appl. No.: 57,173

[22] Filed: Jul. 13, 1979

[30] Foreign Application Priority Data

Jul. 18, 1978 [DE] Fed. Rep. of Germany ....... 2831458

[51] Int. Cl.³ ............................................... B60K 7/00
[52] U.S. Cl. ..................................... 180/305; 74/391; 180/65 F
[58] Field of Search ................... 180/65 F, 54 R, 299, 180/305; 74/391, 394, 801

[56] References Cited

U.S. PATENT DOCUMENTS

| | | | |
|---|---|---|---|
| 3,090,456 | 5/1963 | Blenkle | 180/65 F |
| 3,387,502 | 6/1968 | Le Tourneau | 180/65 F X |
| 3,469,646 | 9/1969 | O'Connor | 180/65 F X |
| 3,812,928 | 5/1974 | Rockwell et al. | 180/65 F |
| 3,969,950 | 7/1976 | Rau et al. | 180/65 F X |

FOREIGN PATENT DOCUMENTS

| | | |
|---|---|---|
| 1922832 | 11/1970 | Fed. Rep. of Germany . |
| 2403463 | 7/1975 | Fed. Rep. of Germany . |
| 2609924 | 9/1976 | Fed. Rep. of Germany . |
| 2330557 | 11/1977 | France . |

*Primary Examiner*—Joseph F. Peters, Jr.
*Assistant Examiner*—Michael Mar
*Attorney, Agent, or Firm*—Karl F. Ross

[57] ABSTRACT

A wheel-mounted drive system usable for a sprocket wheel of a chain-drive vehicle has a nonrotatable two-part housing adapted to be mounted directly and substantially immovably on the vehicle frame. A hydraulic motor is mounted in one part of this housing and has a motor output extending through the other part of the housing which contains a transmission whose input is connected to the motor output and whose output is directly connected to the drive wheel and to a brake. A bearing rotatably mounts the transmission output directly on the housing. The brake can be pressurized through axial passages extending through the main shaft of the motor. The transmission includes planetary gearing, and the motor, transmission, and output member are all rotatable about the same central axis.

10 Claims, 1 Drawing Figure

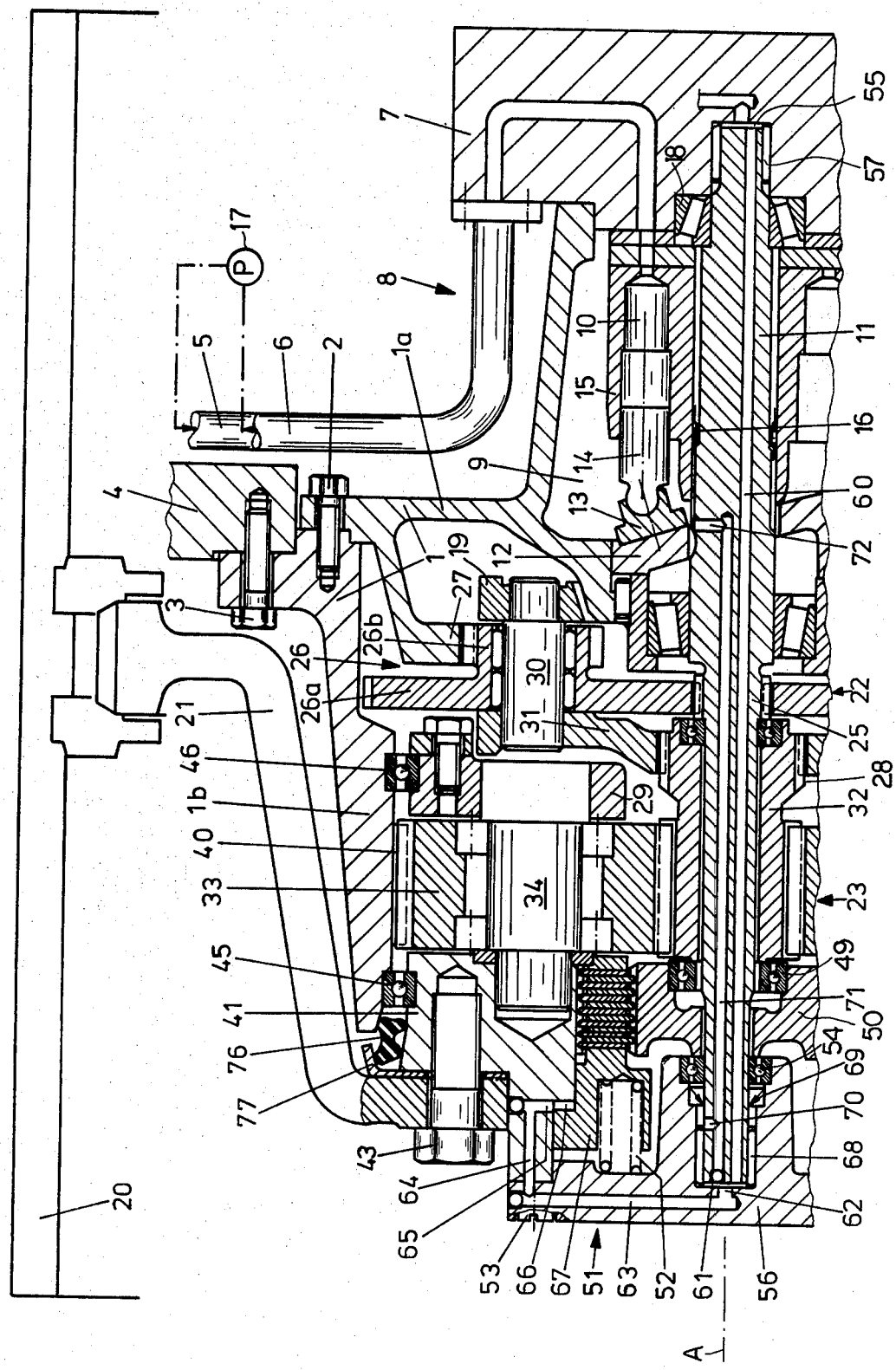

000# WHEEL-MOUNTED HYDRAULIC DRIVE SYSTEM

FIELD OF THE INVENTION

The present invention relates to a wheel-mounted drive system. More particularly this invention concerns such a drive system used in a slow-moving or tracked vehicle.

BACKGROUND OF THE INVENTION

In a slow-moving or tracked vehicle it is standard practice to mount a drive system in each wheel. Such a drive system normally comprises a hydraulic motor powered by one or more central hydraulic pumps, and a transmission connected between the output of the motor and the wheel that constitutes the output of the drive system. A brake is frequently integrated in such a system.

Such systems normally either have the output shaft of the motor lying on an axis offset from the axis of the output of the transmission, or have these two axes coaxial. In the former case the system can rarely fit within the center of anything but a very large wheel, and in the latter case the overall axial length of the assembly is relatively great. Furthermore since such an assembly is normally mounted virtually at ground level, it must be protected, so that the shielding for the equipment and its hydraulic lines normally takes up further valuable space.

As a result such systems are normally extremely difficult to install and service. They must normally be assembled directly in place, and any subsequent work on such drive systems is extremely difficult, normally entailing complete disassembly of the entire arrangement.

OBJECTS OF THE INVENTION

It is therefore an object of the present invention to provide an improved hydraulic drive system particularly usable in a tracked vehicle.

Another object is to provide such a system which is relatively compact, yet easy to install and service.

A further object is to provide a hydraulic drive system wherein complicated shielding of the mechanism is unnecessary so that its size can further be reduced.

SUMMARY OF THE INVENTION

These objects are attained according to the instant invention in a wheel-mounted drive system comprising a nonrotatable housing adapted to be mounted directly and substantially immovably on a vehicle frame inside a wheel and having a hydraulic motor whose output is connected to the input of a transmission whose output is directly connectable to the drive wheel. This output itself is directly mounted via bearings on the housing. In such an arrangement the motor and transmission are coaxial and the bearings are roller bearings having inner races directly mounted on the transmission output, outer races directly mounted on the housing, and roller elements between the races.

It is possible for such a drive system to be extremely compact, so that it fits completely within the hub of a drive wheel or drive wheel sprocket, and within the vertical outlines of the track of a tracked vehicle. Furthermore the entire unit can be mounted as a single subassembly in the wheel, so that in the event that it must be exchanged this work can be done with relative ease.

According to further features of this invention a brake is provided directly inside the housing, this brake being effective to lock the transmission input and output relative to each other so as to arrest rotation inside the drive system. Furthermore a single cover plate on the side of the transmission remote from the drive motor can be removed for access to the brake and various seals around the wheel. Thus it is possible in a very simple manner to gain access to the interior of the drive system for servicing without having to remove the wheel or otherwise disassemble the drive system.

According to additional features of this invention the transmission is of the planetary type. By appropriate combining of complex and simple planetary gearing it is possible to obtain virtually any transmission ratio. Furthermore when an axial-piston motor is used as the drive motor in the drive system it is possible by varying the angle of the swash plate further to tailor the output speeds of the drive system to virtually any desired operating conditions. Of course tipping the axis of the motor relative to that of the drive system can achieve the same effect as changing the swash plate.

In accordance with further features of this invention the housing of the drive system comprises only two parts which are bolted in opposite axial directions together. Removal of the one part gives complete access to half of the mechanism and removal of the other part gives access to the other half. Furthermore it is possible for a manufacturer to make a whole line of subassemblies that are all universally combinable so that a drive system can be custom made for virtually any application merely by appropriate selection of the transmission on one hand and motor on the other hand.

The transmission according to this invention is planetary and has two stages. The first stage includes complex planetary gearing having two-part planetary gears, including a large-diameter part meshing with the sun gear on the output of the motor and a small-diameter part meshing with a ring gear formed on the motor housing. The planet carrier for these two-part planet gears is connected to the sun gear of a single-stage or simple planetary gear transmission whose planet gears mesh with a ring gear fixed on the transmission housing and whose planet carrier is rotationally fixed to and constitutes part of the output of the drive system. The motor output shaft extends axially entirely through the transmission and is connected to one side of a brake whose other side can be brought to bear on the output of the transmission. Thus the input and output of the transmission can be locked relative to each other so as to prevent rotation of the output of the drive system.

This brake is spring-loaded into the closed position according to this invention and can be hydraulically pressurized to open and allow the drive system to rotate its output. The brake is pressurized through a passage extending axially through the motor shaft, so that space-wasting shields for the hydraulic feed lines of this brake, which is placed at the opposite end of the drive system from the motor for maximum compactness, is eliminated. The drive shaft can be of two coaxial pieces so that different motors can be used in a given transmission assembly.

BRIEF DESCRIPTION OF THE DRAWING

The sole FIGURE of the drawing is an axial section through a drive system according to the instant invention.

SPECIFIC DESCRIPTION

The drive system according to this invention has a housing 1 comprising a motor part 1a and a transmission part 1b. The entire assembly is centered on an axis A and the two parts 1a and 1b are held together by axially extending machine screws 2. Further machine screws 3 secure part 1b to the chassis 4 of a tracked vehicle having the drive system according to this invention.

A high-pressure hydraulic feed line 5 and low-pressure return line 6 lead from a pump 17 mounted elsewhere on the frame 4 of the vehicle. The motor part 1a carries a control plate 7 of a hydraulic motor 8 of the axial-piston type. The part 1a has an interior 9 in which a plurality of cylinders 15 forming chambers 10 receive axial pistons 14 having respective shoes 13. These shoes 13 ride on a swash plate 12 which may according to this invention be exchanged for different torque outputs. The motor 8 is connected at splines 16 to an axially extending main motor-output shaft 11 that is supported at bearings 18 in the control plate 7 at one end.

The vehicle according to this invention has a drive chain 20 of a width substantially equal to that of the motor assembly measured along the axis A, and operated by means of a sprocket wheel 21 powered by the drive system of this invention. The motor output shaft 11 is connected via compound planetary gearing 22 and simple planetary gearing 23 to this sprocket wheel 21.

More particularly the compound planetary gearing 22 comprises a sun gear 25 formed directly on the shaft 11 and meshing with a large gear part 26a of a double gear 26 whose small gear part 26b meshes with a ring gear 27 formed unitarily in the motor housing part 1a. These double gears 26 are rotatable on respective planet pins 30 journaled at one side in a planet carrier 31 and at the opposite side in a planet ring 19.

The planet carrier 31 is connected at splines 28 to the sun gear 32 of the simple planetary gearing 23. The sun gear 32 in turn meshes with planet gears 33 that also mesh with a ring gear 40 formed directly on the transmission part 1b. Planet pins 34 rotatably carry the planet gears 33 and are supported in a planet ring 29 to one axial side of the gears 33 and in another planet ring 41 on the other axial side of the planet gears 33. This planet carrier 41 constitutes the output of the drive assembly and of the transmission formed by the gearing 22 and 23. Bolts 43 secure the sprocket wheel 21 to this output member 41, and in addition secure a holding ring 77 for a seal 76 engaged between the output member 41 and the extreme axial end of the housing part 1b.

According to this invention roller bearings 45 and 46 axially flanking the gears 33 rotationally support the output member 41 on the housing part 1b. Thus the output member 41 and the sprocket wheel 21 are supported in an extremely simple and robust manner directly on the fixed housing part 1b.

According to this invention a brake 51 is provided between a wheel 50 supported via a bearing 49 on the sun gear 32 and splined to the shaft 11, and a member 67 rotationally locked to the output member 41. An end plate 56 is secured by screws 53 to the output member 41 and supports the far end of the shaft 11 via a roller bearing 54. The brake 51 is formed as a disk-type clutch and is held by compression springs 52 in a position rotationally locking the shaft 11 to the output member 41. This effectively locks the input and output of the transmission formed by the gear trains 22 and 23 to each other, so as completely to stop rotation of the output member 41 relative to the housing 1.

The shaft 11 is formed with a first throughgoing passage or bore 60 opening into a small chamber 61 at the output end of the shaft 11 and communicating via passages 62-65 with a chamber 66 to one side of the element 67 that is formed as an annular piston. Pressurization of this annular chamber 66 through the passages 60 and 62-65 therefore opens the brake and allows the transmission formed by the gear trains 22 and 23 to operate. A seal 68 is provided immediately in back of the output end of the shaft 11. A similar seal 57 is provided immediately in front of a chamber 55 formed at the opposite end of this shaft 11, so that the axial forces on this shaft 11 by pressurization of the chamber 66 for the brake 51 will be equalized and not tend to axially shift the shaft 11. In the event of some leakage in the brake 51 the shaft 11 is formed with a second axially extending passage 71 opening at one end at a radial passage 70 between the seal 68 and a gland 69 and at the other end at a radial passage 72 inside the motor compartment 9.

The assembly according to the instant invention can easily be manufactured with several different transmission assemblies inside a transmission housing 1b and several different motor assemblies inside a motor housing 1a. In addition the swash plate 12 can easily be exchanged for a swash plate lying at a different angle, so that virtually any output speed or torque can be obtained.

In the event that the most wear-prone parts of this assembly—the seal 76 and brake 51—need servicing, it is extremely easy to pull the screws 53 or the screws 43 to reveal the structure needing servicing. The entire assembly need not be taken apart as in the prior-art arrangements. Similarly the motor can easily be serviced or changed by pulling the screws 2 and unbolting the entire motor housing 1a. Furthermore the entire assembly can easily be removed by unhooking the various hydraulic lines and removing the screws 3. All of these hydraulic lines are connected to one end of the assembly, here the relatively protected inside portion, so that the hitherto considerable shielding problems for these lines are largely eliminated. In fact the passage 70 can be connected via check valves to both of the lines 5 and 6 so as to be at the higher pressure of these lines 5 and 6. Thus whenever the motor 8 is pressurized and operated the brake will automatically be released, whereas whenever pressure feed to the motor 8 is stopped, the brake 51 will automatically close. It is also, of course, possible to provide a separate hydraulic actuating circuit for the brake 51.

We claim:
1. A wheel-mounted drive system comprising:
   a hollow nonrotatable housing adapted to be mounted directly and substantially immovably on a vehicle frame;
   a hydraulic motor mounted in said housing and having a motor output centered on an axis;
   a transmission mounted in said housing and having
      a transmission input sun gear connected to said motor output and centered on said axis,
      a ring gear centered on said axis and fixed on said housing, planet gears meshing with said ring and sun gears, and a planet carrier carrying said planet gears and constituting a transmission output centered on said axis and connectable directly to a drive wheel; and a bearing rotatably mounting said transmission output directly on said housing and having an inner race directly engaging said output, an outer race directly engaging said housing, and roller elements between said races.

2. The system defined in claim 1, further comprising a brake connected to said transmission output in said housing.

3. The system defined in claim 2 wherein said brake is effective between said motor and transmission outputs to rotationally connect same together.

4. The system defined in claim 2 wherein said housing has a removable cover plate, said brake being fully accessible with said cover plate removed.

5. The system defined in claim 2 wherein said motor output is a shaft extending axially completely through said transmission and formed with an axially throughgoing passage, said brake being hydraulic and being pressurizable through said passage.

6. The system defined in claim 1, further comprising a seal between said transmission output and said housing.

7. The system defined in claim 1 wherein said housing has a pair of separable parts, one of said parts containing said transmission and the other part containing said motor.

8. The system defined in claim 1 wherein said input and outputs are all coaxial.

9. The system defined in claim 1 wherein two such bearings are provided axially flanking said planet gears.

10. The system defined in claim 9 wherein said planet carrier has two axially spaced parts each engaging a respective one of said bearings.

* * * * *